G. M. LEAR.
FOOD HEATER.
APPLICATION FILED NOV. 6, 1919.

1,357,100.

Patented Oct. 26, 1920.
2 SHEETS—SHEET 1.

Inventor
George M. Lear.
by Wilkinson & Giusta.
Attorneys

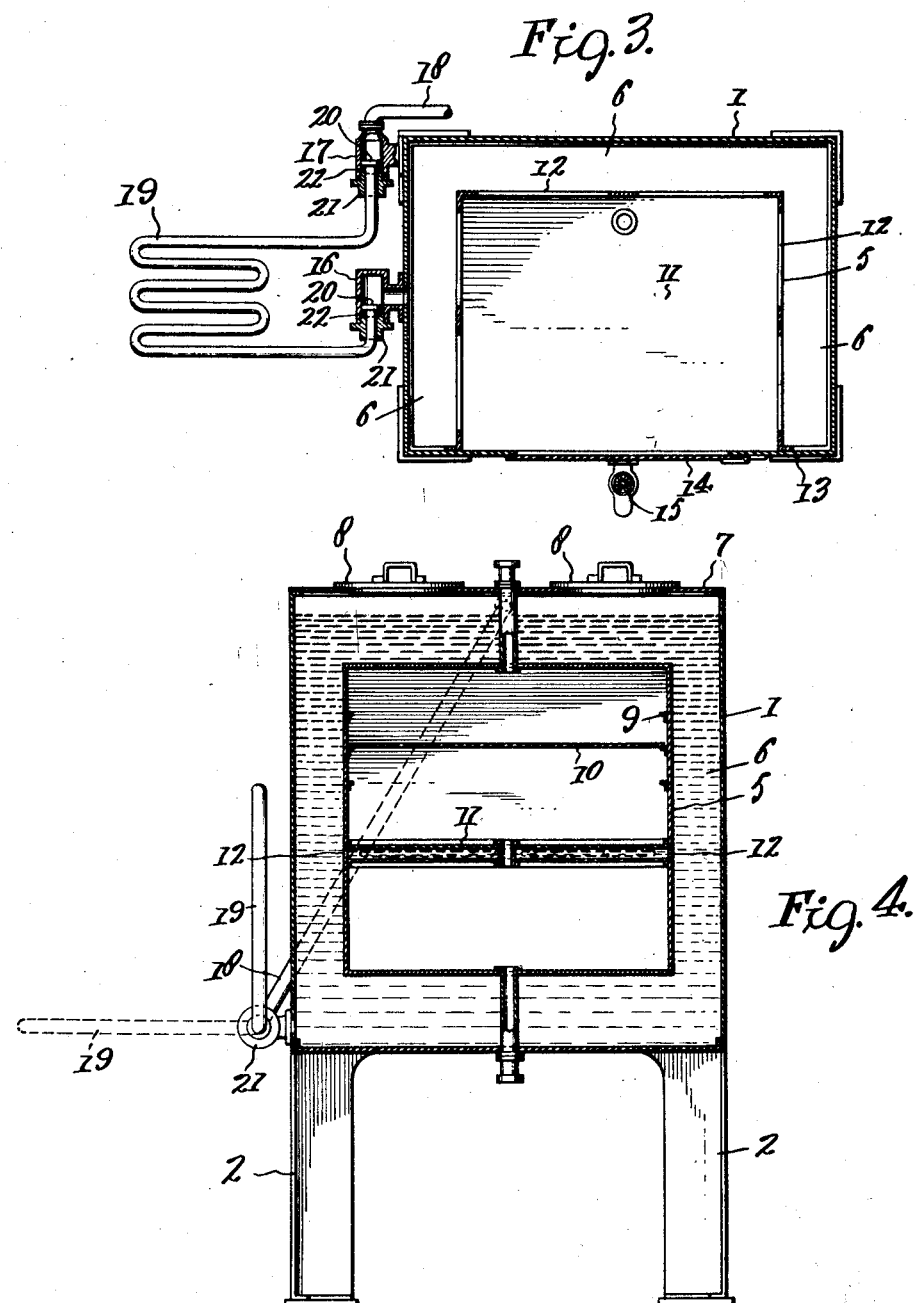

UNITED STATES PATENT OFFICE.

GEORGE M. LEAR, OF NEW ORLEANS, LOUISIANA.

FOOD-HEATER.

1,357,100.  Specification of Letters Patent.  Patented Oct. 26, 1920.

Application filed November 6, 1919. Serial No. 336,102.

*To all whom it may concern:*

Be it known that I, GEORGE M. LEAR, a citizen of the United States, residing at New Orleans, in the parish of Orleans and State of Louisiana, have invented certain new and useful Improvements in Food-Heaters; and I do hereby declare the following to be a full, clear, and exact description of the invention, such as will enable others skilled in the art to which it appertains to make and use the same.

The present invention relates to improvements in heaters for keeping food hot after being cooked, and has for an object to provide a heating cabinet that may be used as an accessory to the usual range or gas stove and which is adapted to keep the various dishes hot after the same have been cooked on the range or gas stove.

In the accompanying drawings forming a part of this application, and in which similar reference symbols indicate corresponding parts in the several views:

Fig. 3 is a horizontal sectional view taken on the line 3—3 in Fig. 2; and

Fig. 4 is a vertical sectional view taken on the line 4—4 in Fig. 1.

Figure 1:
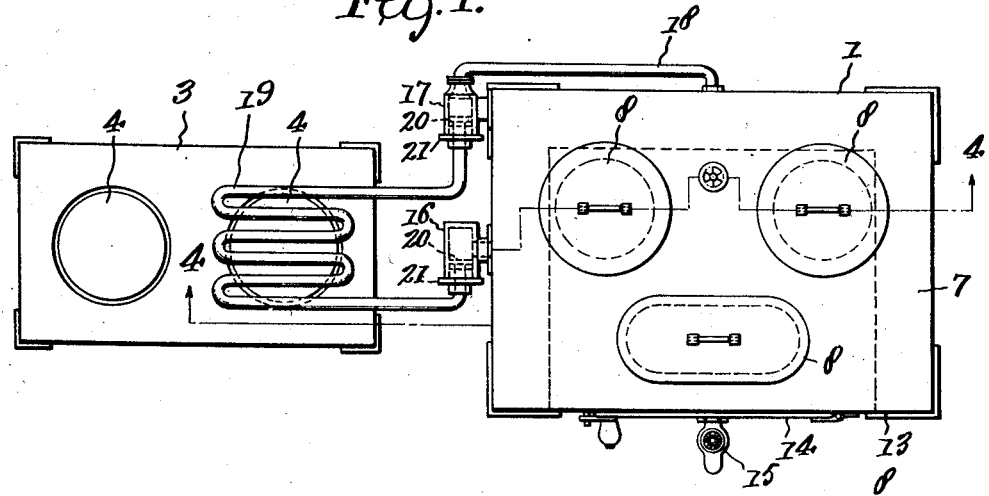
Figure 1 is a top plan view of an improved heater constructed in accordance with the present invention and shown in connection with a stove.
Figure 2:
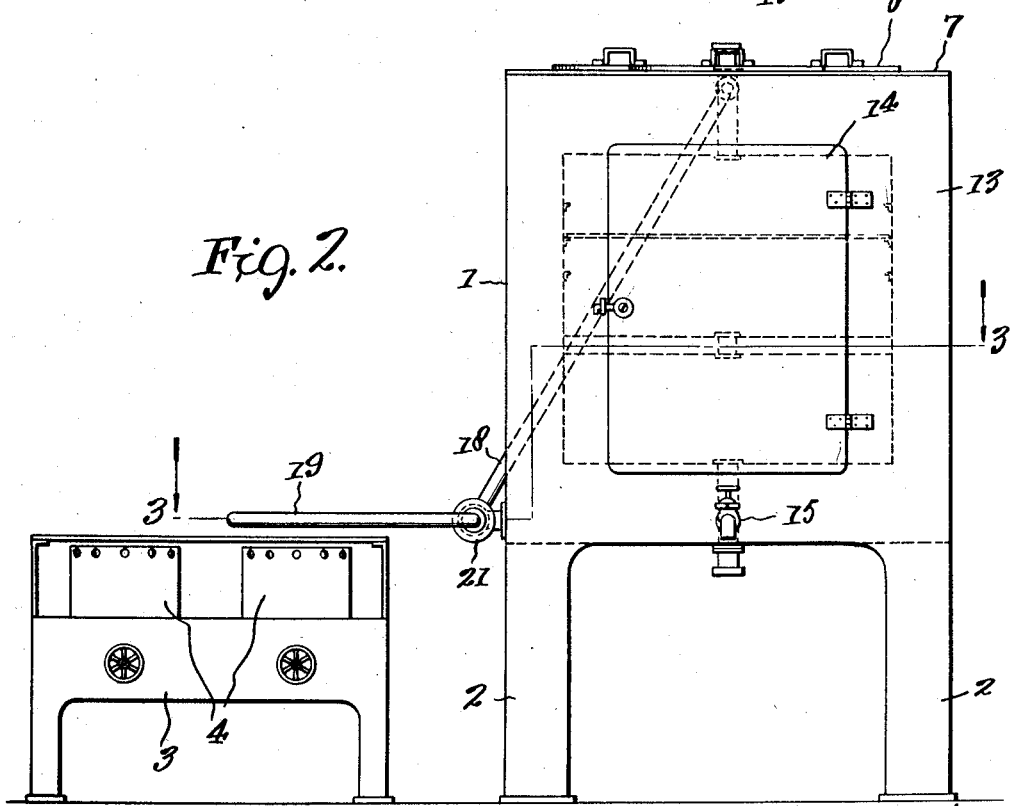
Fig. 2 is a front elevational view of the same.

Referring more particularly to the drawings, 1 designates generally the improved cabinet or heater which may be formed of sheet metal or other suitable material in any desired size and shape, and the same is preferably supported on legs 2 which admit of the cabinet being moved up close to the range or stove indicated at 3; such stove having one or more burners indicated at 4.

The cabinet 1 is made with an interior box-like structure 5 having its walls separated from the exterior walls of the cabinet 1 so as to provide water spaces 6 between the box-like receptacle 5 and the exterior walls of the cabinet; and it is intended to keep this space 6 constantly filled with water up to a level very close to the top 7 of the cabinet, which has openings therein closed by covers or lids 8 which may be removed, in the same manner as stove lids are removed, to permit kettles or dishes to be placed in the openings therein.

The interior receptacle 5 is provided with pairs of ledges 9 on which removable or fixed partitions 10 may be supported. A double walled shelf 11 is provided beneath the partitions 10, and there are openings 12 to admit the hot water from the spaces 6 between the walls of the shelf 11 to heat directly dishes placed on such shelf.

The receptacle 5, as indicated in Fig. 3, is attached to the front wall 13 of the cabinet 1, and there is a door 14 provided in this wall 13 to give access to the interior of the receptacle for the purpose of placing and removing dishes. A faucet 15 is provided beneath the door 14 and communicates with the water space 6; this being provided to permit withdrawal of hot water.

Two fittings 16 and 17 project at one side of the cabinet, the one fitting 16 communicating directly with the water space 6 at the lower part of the cabinet. The other rear fitting 17 is in communication by means of a pipe 18 running up near the top of such water space. A coil 19 has its ends swivelly secured in the fittings 16 and 17 for the purpose of allowing this coil 19 to swing up into the vertical position shown in full lines in Fig. 4 or down to the dotted line position shown in this figure. The ends of the coil 19 are preferably formed with enlargements or heads 20 held in place by means of packing nuts 21 threaded in the fittings, and there being packing 22 interposed between the heads 20 and the packing nuts 21. The two ends of the coil 19 are arranged in axial alinement in the fittings 16 and 17, and such ends and the heads 20 carried thereby turn freely within the packing nuts 21.

In use the cabinet 1 is moved up close to a stove such as indicated at 3, and the coil 19 is lowered over the burner 4; the cabinet 1 having, of course, been previously charged with water in the spaces 6. The cold water will flow from the lower portion of the water space 6 through the fitting at 16 and thence through the coil 19 over the burner 4, by which the same will become heated and pass to the rear fitting 17, from which it will rise in the pipe 18 to the upper portion of the water space 6. This circulation will continue as long as the water is being heated in the coil 19 by burner 4. The hot water in the water spaces 6 will communicate heat to the receptacle 5 and to the dishes placed on the shelves therein, and will keep such food hot and in a moist condition without drying out same.

When the cabinet is not in use the coil 19 may be swung up to the position shown in full lines in Fig. 4, where it will not obstruct the use of the burner 4, and, if desired, the cabinet 1 may be moved away from the stove so as not to hamper cooking operations.

It is obvious that those skilled in the art may vary the details of construction and arrangements of parts without departing from the spirit of my invention, and therefore I do not wish to be limited to such features except as may be required by the claim.

I claim:

In combination with a stove having a burner, of a cabinet adapted to be moved up close to the stove, a compartment in the cabinet having its walls separated from the cabinet walls whereby to provide water spaces therebetween, the compartment communicating with the front of the cabinet, a double walled shelf supported in said compartment in communication with the water space, fittings at one side of said cabinet, one of said fittings being in communication with the water spaces at the lower portions thereof, a pipe placing the other fitting in communication with the water spaces at the top thereof, said pipe being located in rear of the cabinet, a coil having ends arranged in axial alinement and fitted in said fittings, whereby the coil is swivelly supported and adapted to be swung down over the burner of the stove, the top of the cabinet having openings therein, lids for closing the openings, and means for drawing hot water from said cabinet, substantially as described.

GEORGE M. LEAR.